(12) United States Patent
Yoon

(10) Patent No.: US 6,842,508 B1
(45) Date of Patent: Jan. 11, 2005

(54) VOICE MAIL SERVICE SYSTEM FOR A PRIVATE SWITCHING SYSTEM

(75) Inventor: Tae In Yoon, Kyoungki-Do (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 09/658,134

(22) Filed: Sep. 8, 2000

(30) Foreign Application Priority Data

Sep. 10, 1999 (KR) ........................................ 1999-38733

(51) Int. Cl.[7] .............................................. H04M 1/64
(52) U.S. Cl. ................................ 379/88.25; 379/88.07; 714/755
(58) Field of Search ......................... 379/88.22, 88.25, 379/88.26, 88.27, 88.18, 67.1, 88.07; 714/755, 752; 370/245

(56) References Cited

U.S. PATENT DOCUMENTS

| | | | | |
|---|---|---|---|---|
| 4,593,395 A | * | 6/1986 | Schouhamer Immink et al. | 714/755 |
| 5,036,318 A | * | 7/1991 | Bachhuber et al. | 370/245 |
| 5,329,579 A | * | 7/1994 | Brunson | 379/88.26 |
| 5,479,487 A | * | 12/1995 | Hammond | 379/88.22 |
| 5,588,045 A | * | 12/1996 | Locke | 379/67.1 |
| 5,592,473 A | * | 1/1997 | Matern et al. | 379/88.18 |
| 6,002,751 A | * | 12/1999 | Shaffer | 379/88.18 |
| 6,035,018 A | * | 3/2000 | Kaufman | 379/88.25 |
| 6,069,888 A | * | 5/2000 | LaRocca | 379/88.22 |
| 6,205,206 B1 | * | 3/2001 | Hersh et al. | 379/88.26 |
| 6,252,944 B1 | * | 6/2001 | Hansen et al. | 379/88.22 |

* cited by examiner

Primary Examiner—Fan Tsang
Assistant Examiner—Gerald Gauthier
(74) Attorney, Agent, or Firm—Fleshner & Kim, LLP

(57) ABSTRACT

A voice mail service system for a private switching system includes a system matching circuit configured to couple to a private switching system and to interface all information related to a call and management of the call. A voice data memory provides a voice mail function and stores voice guide information in an address sector of a corresponding channel after compressing the voice guide information. A voice and signal processor stores voice data of the extension subscriber in the voice data memory and retrieves it so that the voice data can be transmitted. A communication controller manages a state of each channel matching with the private switching system, processes channel errors and maintains and repairs the channel. A control circuit is used to match with the private switching system to control an operation for maintaining the voice mail function.

29 Claims, 3 Drawing Sheets

VOICE MAIL SERVICE SYSTEM FOR A PRIVATE SWITCHING SYSTEM

BACKGROUND OF THE INVENTION

1. Field of the Invention

The present invention relates to a communications system, and more particularly to a voice mail service system for a private switching system.

2. Background of the Related Art

A private switching system is an appliance for switching the connection of communication channels between a central office line and an extension, or between extensions. The private switching system typically provides a voice mail service. The voice mail service includes an automatic attendant service to guide a state of an extension subscriber to a caller-side terminal when an incoming call is attempted. It does this by means of a voice message when there is no response to the call due to an absence of the extension subscriber or other reason, or when the called extension subscriber's line is in an off-hook state. In order to provide such a voice mail service for a caller who has effected an incoming call to a certain extension subscriber, a separate voice mail service system capable of providing the voice mail service has to be installed in the private switching system.

As shown in FIG. 1, a related art private switching system 1 includes a network connection section 1a connected to a Public Switched Telephone Network (PSTN) 4, a subscriber section 1b having information about subscribers, and a switching section 1c for connecting the network connection section 1a and the subscriber section 1b with each other.

A voice mail service system 2 includes a subscriber matching section 2b interfacing with the subscriber section 1c of the private switching system 1. It further includes a voice signal processing section 2a for compressing service voice signals inputted in a pulse code modulated (CM) state. The voice signal processing section 2a also restores the service voice signal having been compressed in a prescribed mode, and transmits the restored service voice signal through the private switching system 1 to the caller's terminal when an incoming call is detected. By doing this, it can provide the voice mail service. The voice mail service system 2 also includes a voice data storage section 2c for storing data inputted through the voice signal processing section 2a.

A control section 3 controls the operation of the entire system. It performs functions of exchanging call-related messages with the private switching system 1, which is a system of higher rank, exchanging voice messages for providing the voice mail service through the voice signal processing section 2a, and controlling the voice data storage section 2c so as to perform general operations including a recording and a reproduction of processed voice data.

The related art private switching system has various problems. For example, because the voice mail service system is a separate system, it requires a high additional expense. Accordingly, when a private switching system has a relatively small number of extensions, the switching system usually does not provide the voice mail service. Therefore, when an extension subscriber does not answer an incoming call, the caller, who has made the incoming call, is not informed of the state of the extension subscriber. Thus, the caller is apt to repeatedly apply the incoming call, thereby unnecessarily occupying the communication network and adding an extra load on the private switching system.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a voice mail system for a private switching system that substantially obviates the problems caused by the disadvantages in the related art.

Another object of the present invention is to provide a voice mail service system for a private switching system, in which a module capable of providing a voice mail service is installed in the private switching system, so that the private switching system having a small number of subscribers can provide the voice mail service even without a separate voice mail service system.

Another object of the present invention is to provide a voice mail service system for a private switching system, which can provide the voice mail service for a predetermined number of subscribers by each module, so that the number of subscribers to the voice-mail service can be increased according to the necessity of the manager of the private switching system.

It is a further object of this invention to provide a voice mail service system for a private switching system, in which a voice mail line card, constructed as a separate module, is installed in the private switching system, so that the private switching system can provide the voice mail service even without a separate voice mail service system.

To achieve these and other advantages in whole or in parts, there is provided a voice mail service system for a private switching system, the voice mail service system including system matching means matching with the private switching system, so as to interface all information in relation to a call and a management of the call voice data storage means for providing a voice mail function for each extension subscriber connected to the private switching system, and storing voice guide information of the extension subscriber in an address sector of a corresponding channel after compressing the voice guide information, voice and signal processing means for storing voice data of the extension subscriber in the voice data storage means after compressing the voice data, and restoring the compressed voice data applied from the voice data storage means, so that the voice data can be transmitted to a call-connected opponent, communication control means for managing a state of each channel matching with the private switching system, processing troubles of the channel, and maintaining and repairing the channel, and control means matching with the private switching system so as to generally control operation for maintaining the voice mail function.

To further achieve these and other advantages in whole or in parts, there is provided a voice mail service system for a private switching system that includes a system matching circuit configured to couple to a private switching system, so as to interface all information in relation to a call and a management of the call, a voice data memory to provide a voice mail function, and to store voice guide information in an address sector of a corresponding channel after compressing the voice guide information, a voice and signal processor to store voice data of the extension subscriber in the voice data storage means after compressing the voice data, and to restore the compressed voice data received from the voice data memory, so that the voice data can be transmitted, a communication controller to manage a state of each channel matching with the private switching system, process channel errors, and maintain and repair the channel, and a control circuit to match with the private switching system to control an operation for maintaining the voice mail function.

To further achieve these and other advantages in whole or in parts, there is provided a method of providing voice mail service for a private switching system that includes recording a subscriber's voice message in a voice data memory of a line card, determining an off hook or nonresponsive state of the subscriber in response to an incoming call, transferring the incoming call to a system matching section of the line card, temporarily storing the subscriber's voice message in the system matching section, providing automatic voice guide service to a control section of the line card, accessing compressed voice data of the subscriber in the voice data memory by the control section, providing the compressed voice data and a control signal to a voice and signal processor of the line card, and decompressing and transmitting the subscriber's voice message through a vocorder of the line card to the incoming caller.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
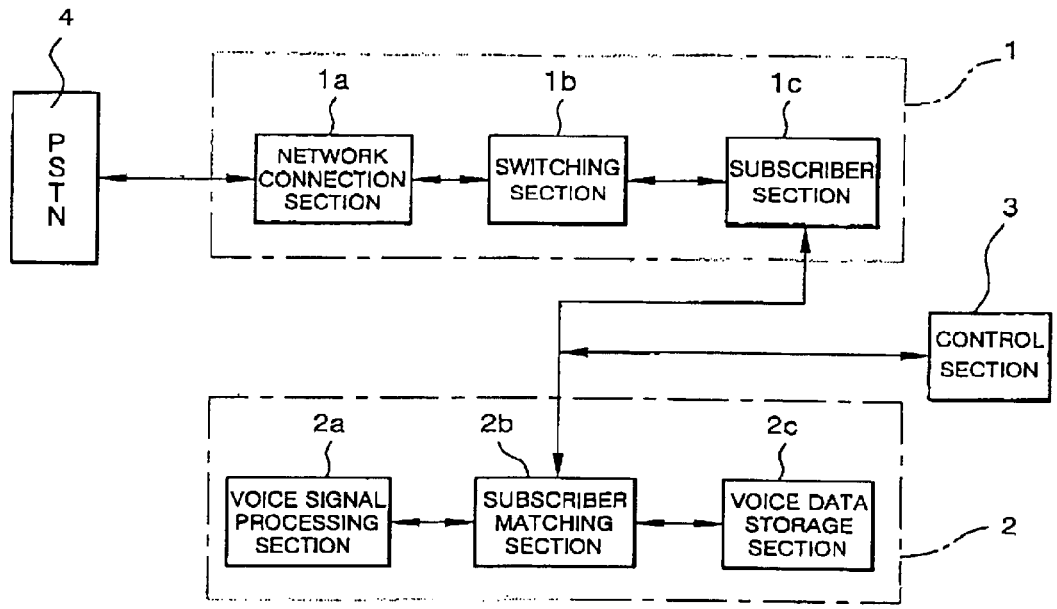
FIG. 1 is a block diagram showing a schematic construction of the related art voice mail service system for a private switching system.
Figure 2:
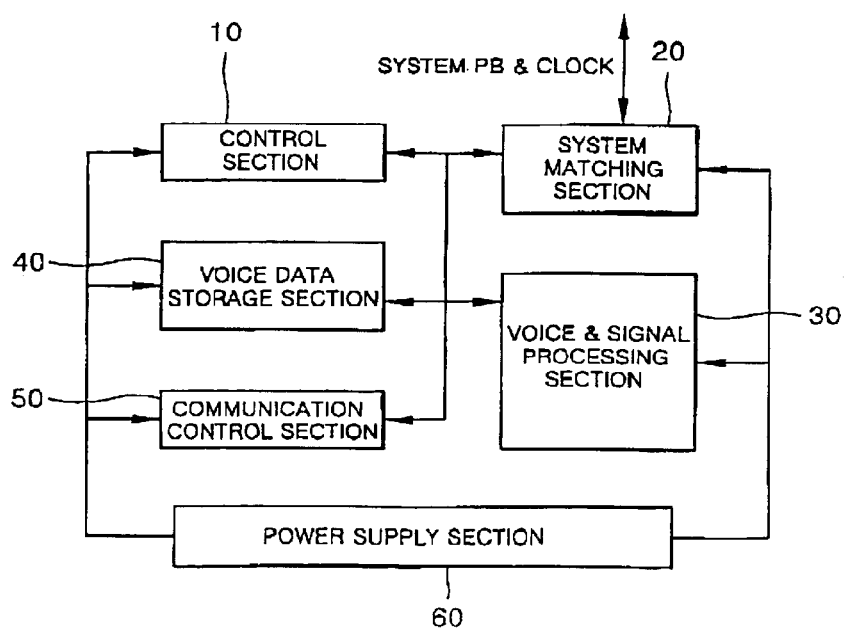
FIG. 2 is a block diagram showing a voice mail service system for a private switching system according to a preferred embodiment of the present invention.

Referring to FIG. 2, a voice mail service system for a private switching system according to a preferred embodiment of the present invention is preferably embodied in a line card. It includes a control section 10, a system matching section 20, a voice and signal processing section 30, a voice data storage section 40, a communication control section 50, and a power supply section 60.

The control section 10 preferably controls the line card module. That is, the control section 10 exchanges call-related messages with the private switching system, which is a system of higher rank, through the system matching section 20. It also exchanges voice messages for providing the voice mail service through the voice and signal processing section 30, and controls the voice data storage section 40 so as to perform general operations including recording and reproduction of processed voice data.

Figure 3:
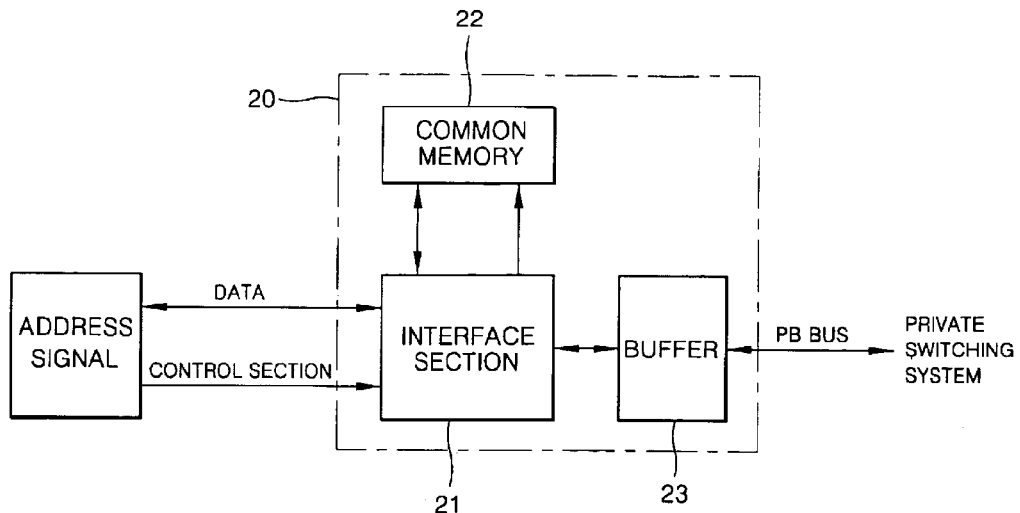
FIG. 3 is a block diagram showing a system switching section of the voice mail service system shown in FIG. 2.

The system matching section 20 performs interfacing for communication between the control section 10 and the private switching system. As shown in FIG. 3, the system matching section 20 includes an interface section 21 for interfacing with the private switching system, and a buffer 23 for temporarily storing data transmitted to and received from the private switching system. The data is transmitted and/or received using a private branch system in a prescribed protocol through a parallel bus (PB). It also includes a common memory 22 for storing the call-related messages and various information data transmitted and/or received between the private switching system and the control section 10.

The voice and signal processing section 30 compresses voice signals inputted in a PCM state, and restores the service voice signal having been compressed in a prescribed mode when an incoming call is detected. It then transmits the restored service voice signal through the private switching system to the terminal that generated the incoming call to establish the call, so that the private switching system can provide the voice mail service.

Figure 4:
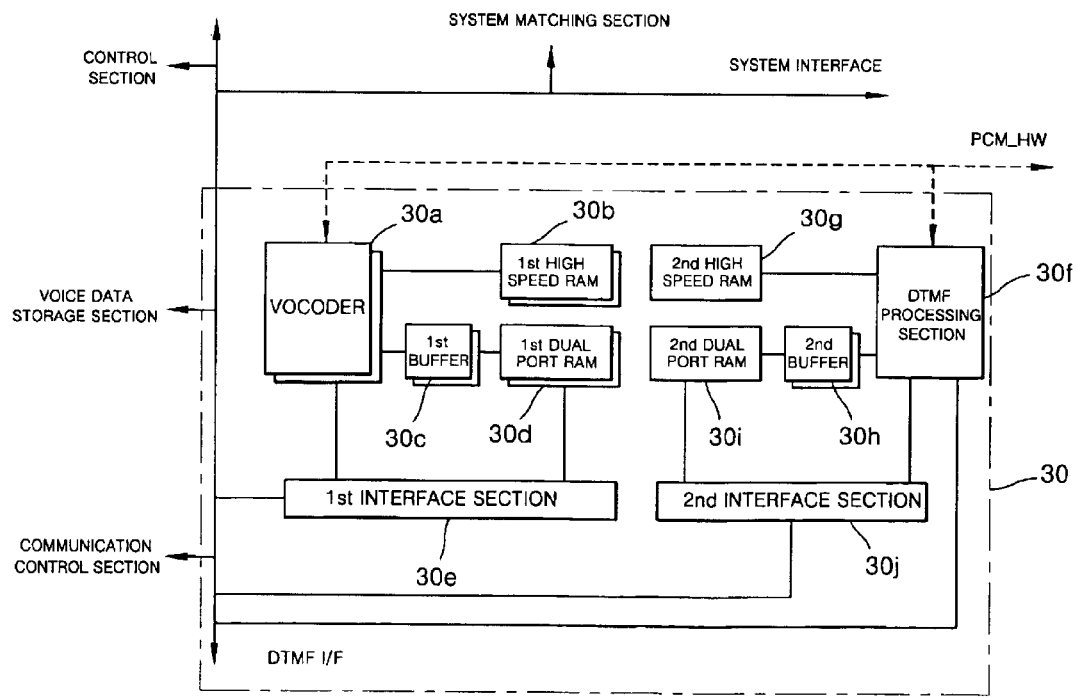
FIG. 4 is a block diagram showing a voice and signal processing section of the voice mail service system shown in FIG. 2.

Referring to FIG. 4, the voice and signal processing section 30 includes a vocoder 30a, a first high speed read access memory (RAM) 30b (also known as random access memory), and a first buffer 30c. The voice and signal processing section 30 further includes a first dual port RAM 30d, a first interface section 30e, and a DTMF processing section 30f. Further, it includes a second high speed RAM 30g, a second buffer 30h, a second dual port RAM 30i, and a second interface section 30j.

The vocoder 30a is connected to the private switching system through a Pulse Code Modulation Highway (PCM HW) and a system interface bus, and compresses and modulates PCM voice signals of an extension subscriber. These PCM voice signals are received through the PCM HW from the private switching system and are arranged for recording in order to provide the voice mail service. The vocoder 30a also demodulates the PCM voice signals, which have been compressed and modulated, so as to transmit the voice signals to the caller side having applied the incoming call.

The first high speed RAM 30b stores an algorithm for the compression-modulation and the demodulation of the PCM voice signals of the vocoder 30a The first buffer 30c temporarily stores the PCM voice signal compression-modulated by the vocoder 30a, and also temporarily stores the PCM voice signal outputted in order to provide the voice mail service. The first dual port RAM 30d maintains smooth transmission and/or reception of the compression-modulated PCM voice signal to be stored in the voice data storage section 40 and the compression-modulated PCM voice signal outputted in order to provide the voice mail service.

The first interface section 30e is preferably connected to the vocoder 30a and the first dual port RAM 30d, so as to arbitrate and control the occupation of system interface bus by the vocoder 30a and the first dual port RAM 30d. The DTMF processing section 30f processes and analyzes Dual Tone Multi-Frequency (DTMF) signals received through the PCM HW from the terminal of the extension subscriber or the call-related caller side terminal. The second high speed RAM 30g stores an algorithm for the operation of the sit DTMF processing section 30f.

The second buffer 30h temporarily stores the analyzed DTMF signals of the extension subscriber or the caller side terminal. The second dual port RAM 30i preferably prevents a collision between the analyzed DTMF signals of the extension subscriber or the caller side terminal and the DTMF signals requiring the analysis.

The second interface section 30j is preferably connected to the DTMF processing section 30f and the second dual port RAM 30i, so as to arbitrate and control their occupation of the system interface bus. In the preferred embodiment, the first and the second dual port RAMs 30d and 30i respectively include banks of memory, each of which stores voice data for providing the voice mail service and a registration for the voice mail service.

The voice data storage section 40 provides a function of the voice mail service for an extension subscriber connected to the private switching system. The voice data storage section 40 includes readable and writable memories, and preferably has a storage capacity, which can be expanded by the unit of memory bank.

The communication control section 50 includes, for example, a Local Area Network (LAN) or an RS-232C transmitter, and functions to manage a state of each channel, process errors of the channel, and maintain and repair the channel.

Figure 5:
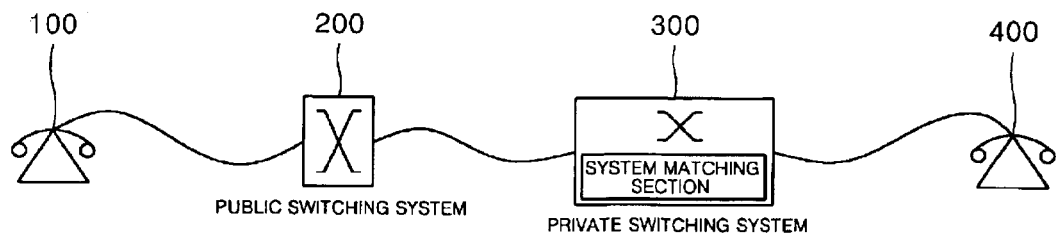
FIG. 5 is a schematic constructional view of a communication network employing the private switching system having the voice mail service system according to a preferred embodiment of the present invention.

As shown in FIG. 5, the voice mail service system for a private switching system according to a preferred embodiment of the present invention is preferably embodied in a module capable of processing voice signals. The module is installed in a private switching system 300 connected to a public switching system 200 and an extension subscriber 400, and interfaces with a processor of higher rank in the private switching system 300.

An operation of a voice mail service system for a private switching system according to a preferred embodiment of the present invention will next be described. First, a process in which voice guide messages are recorded according to a request by a certain extension subscriber 400 connected to the private switching system 300 in a general communication network shown in FIG. 5 will be described.

A key signal, which is generated when an extension subscriber 400 connected to the private switching system 300 selects to record a voice message by means of a key input means provided in his or her own extension terminal, is detected through the PCM HW by the DTMF processing section 30f in the voice and signal processing section 30. In the preferred embodiment, the DTMF processing section 30f is in a state that it is polling a receiving port with a prescribed period according to an algorithm preset in the second high speed RAM 30g.

When the DTMF processing section 30f receives a DTMF signal applied from the private switching system, which is a system of higher rank, the DTMF processing section 30f analyzes the received DTMF signal. It then applies the analyzed result as a single DTMF signal or a single tone through the second interface section 30j to the control section 10.

In the preferred embodiment, when the DTMF signal is determined to be a signal requiring a self-diagnosis, the DTMF processing section 30f diagnoses its own state and then transmits the diagnosed result through the second interface section 30j to the private switching system. Further, when the DTMF signal detected by the control section 10 is determined to be a signal indicating a selection to record a voice message recording, the DTMF processing section 30f proceeds in a voice recording mode. It then applies a control signal for performing a voice recording through the system interface bus to the vocoder 30a in the voice and signal processing section 30.

When the vocoder 30a in the voice and signal processing section 30 detects the control signal for performing a voice recording while polling each port of an order receiving register in 30e with a period of, for example, 125 microseconds, the vocoder 30a compresses the voice data applied through the PCM HW from the private switching system, and then stores it in the first buffer 30c.

In this case, the initial point of time at which compression of the voice data applied through the PCM HW begins is identified by an interrupt provided by the second interface section 30j. Each time slot is determined with reference to a frame synchronous reception (FSR) inputted as a burst signal. In this example, the interrupt would be generated by the control roughly section 3.5 microseconds before the first frame air synchronous transmission (FSR/FSX) is generated.

As described above, the present state in which the voice data inputted through the PCM HW is compressed is recorded in a state report register to be reported to the control section 10. The report is performed once respectively when the voice recording is started and when the voice recording is ended.

Figure 6:
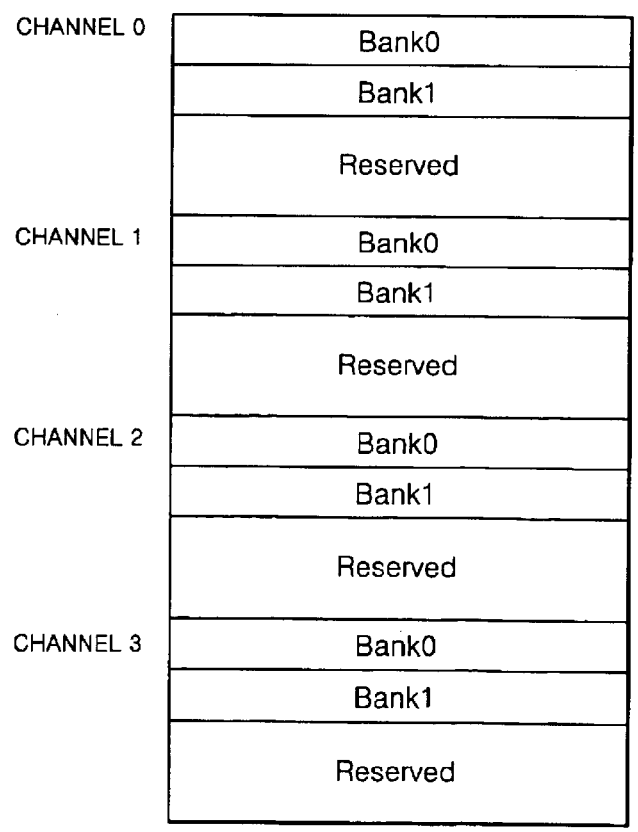
FIG. 6 is a schematic constructional view showing the address map of a DRAM for a vocoder of the voice and signal processing section shown in FIG. 4.

When about ten bytes of voice data, an amount corresponding to ten milliseconds, have been compressed, a value stored in the first buffer 30c is recorded as 16 bits in a prescribed address of a corresponding channel of the first dual port RAM 30d. The dual RAM port 30d has a construction as shown in FIG. 6. An address value of the first dual port RAM 30d, having been increased up to the present, is recorded in each port address latch register.

The first dual port RAM 30d continuously stores the PCM voice data compressed as described above up to bank 1 of the corresponding channel. In this example, since one bank has a size of two kilobytes, the first dual port RAM 30d returns to the initial address when all of four kilobytes have been filled.

When a corresponding channel of the vocoder 30a is in a state of recording, as reported by the state register, it initially waits until after the control section 10 applies a voice recording order to the voice and signal processing section 30 according to a ad detection of the DTMF signal. Then, the control section 10 reads the address latch register of the corresponding channel with a period of ten milliseconds. It next reads data of the corresponding channel when one bank of the first dual port RAM 30d is completely filled. It then stores the data in the PSTN 4. In the preferred embodiment, the address read by the address latch register has a size such that one address can store one word.

While performing the compression of the recording voice data as described above, the vocoder 30a polls the first interface section 30e, so as to detect the next recording order.

When recording a voice message, if a DTMF signal selecting to end the recording is detected from the corresponding subscriber terminal, the control section 10 outputs an order to end the operation for compressing the voice recording data for the corresponding channel to the vocoder 30a. In the preferred embodiment, when the vocoder 30a detects a signal to stop the execution of the recording order, the vocoder 30a immediately stops the execution of the compression-recording of the voice data having been in progress up to then. It then records the address, which has progressed until then, in the address record register, and reports the state to the control section 10. The control section 10 then stores the voice and its size up to the final address in the voice data storage section 40.

When a voice message has been recorded in the voice data storage section 40 as described above, the recorded voice message is transmitted to a caller who has placed an incoming call from a terminal 400 of the private switch 300 or a terminal 100 of a public switch. Such a process is described hereinbelow. It should be noted that the incoming call could be placed from an extension subscriber 400 or a terminal 100, as shown in FIG. 5.

When a certain terminal 100 calls a certain extension subscriber 400 connected to the private switching system 300 through a call intermediation by the public switching system 200, and the terminal of the called extension subscriber 400 connected to the private switching system 300 is in an off-hook state or does not answer the call by reason of, for example, an absence of the called subscriber, the processor in the private switching system 300 transfers the connected call through the parallel bus to the system matching section 20.

The system matching section 20 temporarily stores the call-related messages, which is applied through an intermediation by the private switching system 300, and information about the call-related messages in the common memory 22. It next transmits a signal required to provide the automatic voice guide service to the control section 10. When a service start order is detected, the control section 10 accesses the voice data of the corresponding channel stored in a compressed state in the voice data storage section 40. The service start order is applied through the system interface bus from the system matching section 20, and prompts for the recorded voice messages. The control section 10 thereafter applies the voice data and a control signal to provide the voice message to the voice and signal processing section 30. Then, a control signal is sent over the system bus to the voice and signal processing section 30. In response to this control signal, the voice and signal processing section 30 executes a provision of the guide message and the voice data in a compressed state is stored in the first dual port RAM 30d through the first interface section 30e. At the same time, an order for a reproduction of voice is recorded in the state register of the vocoder 30a.

At this time, the vocoder 30a is in a state of polling each port of the order receiving register in the first interface section 30e with a period of, for example, 125 microseconds. Therefore, when an order for a voice reproduction is detected, the vocoder 30a reads the voice data stored in the first interface section 30e five words by five words, so as to restore the voice data into PCM data. It then transmits the PCM data through PCM HW to the caller, who has made the incoming call. Further, the state register in the vocoder 30a records address information in the address latch register, while proceeding with accessing the PCM voice data stored in the first dual port RAM 30d.

In this case, the point of time at which the PCM HW starts to be occupied in order to output the voice data restored in the process as described above is identified by the interrupt, and each time slot is determined with reference to the burst FSR. In a preferred embodiment, the interrupt is generated by the control section approximately 3.5 microseconds before the first burst FSR/FSX is generated.

When the vocoder 30a has proceeded with the access up to the bank 1 of the corresponding channel of the first dual port RAM 30d, the vocoder 30a returns to the initial address and proceeds with the restoration and providing of the voice message for the corresponding channel from the start again.

When the control section 10 has transmitted the voice reproduction order to the voice and signal processing section 30 according to the voice reproduction order from the private switching system 300, and when the corresponding channel is identified to be in a state of reproduction by means of the signal reported from the state register of the vocoder 30a, the control section 10 reads the address latch register of the corresponding channel with a period of ten milliseconds. It does this to record the next channel bank of the first dual port RAM 30d when two-thirds of the access to the corresponding channel bank have been completed.

Further, while the voice guide service is being provided, if the detected DTMF signal is determined to be a signal calling a node of the service or other token, the control section 10 provides a control signal through the system interface and the first interface section 30e in the voice and signal processing section 30 to the vocoder 30a. This is done to make the corresponding channel idle. Thereafter, the control section 10 records a new voice token in an initial address sector of the first dual port RAM 30d, and makes the vocoder 30a to restore and transmit the voice data of the corresponding channel.

When the recorded guide message is being transmitted as described above, and when a preset call is detected by the control section 10 as a signal for the ending, the control section 10 outputs a signal for ending the restoration of the guide message to the voice and signal processing section 30. It then receives a responding signal to the outputted signal, so as to end the service of providing the voice guide message.

As described above, the voice mail service system for a private switching system according to the present invention has many advantages. For example, it is embodied into a module shaped as a line card, so that it can be simply matched with and installed in a conventional switching system. Further, the voice mail service system of the present invention enables the private switching system to provide voice mail service without a separate voice mail service system. This not only to reduces the expense of a separate voice mail service system, but also improves the reliability of the private switching system.

In addition, since each card can accommodate a certain number of subscribers, the capacity of the private switching system can be easily increased according to the necessity of the manager of the private switching system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A voice mail service system for a private switching system comprising:

a system matching circuit and a system matching section configured to couple to a private switching system, which is a system of higher rank, so as to interface all information in relation to a call and management of a call including call-related messages, exchanging voice messages, recording and reproduction of processed voice data and perform interfacing for communication between a control section and the private switching system, which is a system of higher rank;

a voice data memory to provide a voice mail function, and to store voice guide information in an address sector of a corresponding channel;

a voice and signal processor to store voice data of the extension subscriber in the voice data memory and retrieve it so that the voice data can be transmitted;

a communication controller to manage a state of each channel matching with the private switching system, which is a system of higher rank, process channel errors, and maintain and repair the channel and wherein the communication controller directly and automatically determines a busy or nonresponsive state of the subscriber in response to an incoming communication from a terminal and transfers the call to the system matching circuit and system matching section; and a control circuit to match with the private switching system, which is a system of higher rank, to control an operation for maintaining the voice mail function, wherein the voice and signal processor comprises:

a vocoder coupled to the private switching system and configured to compress and modulate voice signals;

a first high speed RAM to store an algorithm for a compression-modulation and a demodulation of the voice signals by the vocoder;

a first buffer to store the voice signal compressed and modulated by the vocoder and the voice signal outputted;

a first dual port RAM to maintain a smooth transmission and a smooth reception of the compressed and modulated voice signal to be stored in the voice data memory and the voice signal outputted; and a first interface circuit coupled to the vocoder and the first dual port RAM, so as to arbitrate and control occupations of a system interface bus by the vocoder and the first dual port RAM.

2. The system of claim 1, wherein the voice mail service system is a line card, configured to couple to the private switching system.

3. The system of claim 2, wherein the line card accommodates a prescribed number of extension subscribers, and wherein an increase in a number of line cards can increase a number of extension subscribers capable of being served with the voice mail service.

4. The system of claim 1, wherein the system matching circuit comprises:

an interface section to interface with the private switching system;

a buffer to store data transmitted to and received from the private switching system in a prescribed protocol; and a memory to store call-related messages and data transmitted or received between the private switching system and the control circuit.

5. The system of claim 1, wherein the voice data memory has a prescribed storage capacity, which is expandable.

6. The system of claim 1, wherein the voice signals comprise PCM voice signals.

7. The system of claim 1, wherein the voice and signal processor further comprises:

a Dual Tone Multi-Frequency (DTMF) processor to process and analyze DTMF signals received from a terminal of the extension subscriber or a caller side terminal;

a second high speed RAM to store an algorithm for an operation of the DTMF processor;

a second buffer to temporarily store analyzed DTMF signals;

a second dual port RAM to prevent a collision between the analyzed DTMF signals and the DTMF signals; and a second interface circuit coupled to the DTMF processor section and the second dual port RAM, to arbitrate and control the occupation of a system interface bus.

8. The system of claim 7, wherein the first and the second dual port RAMs respectively comprise banks of memory, each of which store voice data to provide the voice mail service and a registration for the voice mail service.

9. The system of claim 7, wherein data transmission/reception between the vocoder and the DTMF processor is carried out through a PCM highway, and is controlled by the control circuit.

10. The system of claim 6, wherein the first and the second dual port RAMs respectively comprise banks of memory, each of which store voice data to provide the voice mail service and a registration for the voice mail service.

11. The system of claim 6, wherein data transmission/reception between the vocoder and the DTMF processor is carried out through a PCM highway, and is controlled by the control circuit.

12. A voice mail service system for a private switching system comprising:

a system matching circuit and a system matching section configured to couple to a private switching system which is a system of higher rank, so as to interface all information in relation to a call and management of a call including call-related messages, exchanging voice messages, recording and reproduction of processed voice data and perform interfacing for communication between a control section and the private switching system, which is a system of higher rank;

a voice data memory to provide a voice mail function, and to store voice guide information in an address sector of a corresponding channel;

a voice and signal processor to store voice data of the extension subscriber in the voice data memory and retrieve it so that the voice data can be transmitted;

a communication controller to manage a state of each channel matching with the private switching system, which is a system of higher rank, process channel errors, and maintain and repair the channel and wherein the communication controller directly and automatically determines a busy or nonresponsive state of the subscriber in response to an incoming communication from a terminal and transfers the call to the system matching circuit and system matching section; and a control circuit to match with the private switching system, which is a system of higher rank, to control an operation for maintaining the voice mail function, wherein the voice and signal processor comprises:

a Dual Tone Multi-Frequency (DTMF) processor to process and analyze DTMF signals received from a terminal of the extension subscriber or a caller side terminal;

a high speed RAM to store an algorithm for an operation of the DTMF processor;

a buffer to temporarily store analyzed DTMF signals;

a dual port RAM to prevent a collision between the analyzed DTMF signals and the DTMF signals; and an interface circuit coupled to the DTMF processor section and the dual port RAM, to arbitrate and control the occupation of a system interface bus.

13. The system of claim 1, wherein the voice memory provides the voice mail to each extension subscriber of the private switching system and stores voice guide information of the extension subscriber, and wherein the voice and signal processor stores voice data of the extension subscriber to transmit to an incoming caller.

14. The system of claim 2, wherein the connection to the private switching system is over a parallel bus.

15. The system of claim 4, wherein the private switching system is a system of higher rank than the voice mail system.

16. The system of claim 6, wherein the vocoder is coupled to the private switching network over a PCM highway and a system interface bus, and wherein the PCM voice signals are from an extension subscriber and are received over the PCM highway from the private switching system and are arranged for a recording in order to provide the voice mail service, the vocoder demodulating the compressed and modulated PCM voice signals to transmit the PCM voice signals to a caller side having applied an incoming call.

17. The system of claim 1, wherein the voice and signal processor compresses the voice data prior to it being stored, and decompresses the compressed voice data prior to it being transmitted.

18. The method of claim 1, wherein the data memory, the system matching section, the control section, and the signal processor comprise a line card for providing the message service for the network.

19. The method of claim 1, wherein the subscriber's message is compressed prior to being set in the data memory, and is decompressed prior to transmitting to the terminal.

20. The method of claim 1, wherein the network is a private switching system and the message is a voice message.

21. The method of claim 20, wherein the signal processor includes a voice processor, and the voice message is transmitted to the terminal through a vocoder.

22. The method of claim 21, wherein the voice message service is provided to the private switching system through a line card of the private switching system.

23. The system of claim 1, wherein the voice guide information is compressed prior to storage.

24. The system of claim 4, wherein the memory is a common memory.

25. The system of claim 5, wherein the voice data memory is configured to be expanded by a unit of memory bank.

26. A voice mail service system for a private switching system comprising:
   a system matching circuit and a system matching section configured to couple to a private switching system, which is a system of higher rank, so as to interface all information in relation to a call and management of a call including call-related messages, exchanging voice messages, recording and reproduction of processed voice data and perform interfacing for communication between a control section and the private switching system, which is a system of higher rank;
   a voice data memory to provide a voice mail function, and to store voice guide information in an address sector of a corresponding channel;
   a voice and signal processor to store voice data of the extension subscriber in the voice data memory and retrieve it so that the voice data can be transmitted;
   a communication controller to manage a state of each channel matching with the private switching system, which is a system of higher rank, process channel errors, and maintain and repair the channel and wherein the communication controller directly and automatically determines a busy or nonresponsive state of the subscriber in response to an incoming communication from a terminal and transfers the call to the system matching circuit and system matching section; and
   a control circuit to match with the private switching system, which is a system of higher rank, to control an operation for maintaining the voice mail function, wherein the voice and signal processor comprises:
   a vocoder coupled to the private switching system through a communication link and a system interface bus, configured to compress and modulate voice signals carried over the communication link;
   a storage device to store an algorithm for a compression-modulation and a demodulation of the voice signals by the vocoder;
   a first buffer to store the voice signal compressed and modulated by the vocoder and the voice signal outputted;
   a first multiple access storage device to maintain a smooth transmission and a smooth reception of the compressed and modulated voice signal, to be stored in the voice data memory and the voice signal outputted; and
   a first interface circuit coupled to the vocoder and the first multiple access storage device, so as to arbitrate and control occupations of the system interface bus by the vocoder and the first multiple access storage device.

27. The system of claim 26, wherein the voice and signal processor further comprises:
   a Dual Tone Multi-Frequency (DTMF) processor to process and analyze DTMF signals received from a terminal of the extension subscriber or a caller side terminal;
   a second storage device to store an algorithm for an operation of the DTMF processor,
   a second buffer to temporarily store analyzed DTMF signals;
   a second multiple access storage device to prevent a collision between the analyzed DTMF signals and the DTMF signals; and
   a second interface circuit coupled to the DTMF processor section and the second multiple access storage device, to arbitrate and control the occupation of a system interface bus.

28. The system of claim 27, wherein the first and second multiple access storage devices respectively comprise banks of memory, each of which store voice data to provide voice mail service and a registration for the voice mail service.

29. The system of claim 2, wherein the connection to the private switching system is over a serial bus.

* * * * *